(12) United States Patent
Sukumaran et al.

(10) Patent No.: US 12,328,605 B2
(45) Date of Patent: Jun. 10, 2025

(54) SYSTEMS AND METHODS FOR WIRELESS CHANNEL INFORMATION SHARING

(71) Applicant: EdgeQ, Inc., Santa Clara, CA (US)

(72) Inventors: Venkatesh Sukumaran, Chennai (IN); Sriram Rajagopal, Karnataka (IN); Rahul Sawhney, Bengaluru (IN)

(73) Assignee: EdgeQ, Inc., Santa Clara, CA (US)

( * ) Notice: Subject to any disclaimer, the term of this patent is extended or adjusted under 35 U.S.C. 154(b) by 387 days.

(21) Appl. No.: 17/852,579

(22) Filed: Jun. 29, 2022

(65) Prior Publication Data

US 2024/0007873 A1  Jan. 4, 2024

(51) Int. Cl.
*H04W 24/02* (2009.01)
*H04W 24/08* (2009.01)

(52) U.S. Cl.
CPC ........... *H04W 24/02* (2013.01); *H04W 24/08* (2013.01)

(58) Field of Classification Search
None
See application file for complete search history.

(56) References Cited

U.S. PATENT DOCUMENTS

| | | |
|---|---|---|
| 10,123,341 B2 | 11/2018 | Kang et al. |
| 10,630,410 B2 | 4/2020 | Parkvall et al. |
| 10,903,894 B1* | 1/2021 | Dash ........................ H04L 5/006 |
| 11,096,084 B2 | 8/2021 | Basu Mallick et al. |
| 2020/0022106 A1* | 1/2020 | Kim ....................... H04L 1/1812 |
| 2020/0275348 A1 | 8/2020 | Park et al. |
| 2020/0280827 A1* | 9/2020 | Fechtel ..................... H04W 8/08 |
| 2020/0314690 A1* | 10/2020 | Kim ......................... H04W 4/70 |
| 2020/0374750 A1* | 11/2020 | Lee ..................... H04W 28/0221 |
| 2021/0242974 A1* | 8/2021 | Fujishiro ................ H04W 72/04 |
| 2021/0329495 A1* | 10/2021 | Baek ......................... H04L 1/08 |
| 2022/0061053 A1* | 2/2022 | Ng .......................... H04W 76/15 |
| 2022/0124846 A1* | 4/2022 | Wang ................ H04W 28/0236 |
| 2023/0067498 A1* | 3/2023 | Kugler ................. H04W 76/10 |
| 2023/0276491 A1* | 8/2023 | Niu ...................... H04W 72/232 370/329 |
| 2023/0350045 A1* | 11/2023 | Yerramalli ................ G01S 1/68 |
| 2024/0064791 A1* | 2/2024 | Shen ................... H04W 72/541 |

OTHER PUBLICATIONS

International Search Report and Written Opinion of the International Searching Authority mailed Jul. 31, 2023 in related PCT application No. PCT/US2023/18761, (8 pgs).

* cited by examiner

*Primary Examiner* — Lonnie V Sweet
(74) *Attorney, Agent, or Firm* — Michael North

(57) ABSTRACT

System and method embodiments are disclosed for wireless channel information sharing to improve system performance in a wireless communication system. A software convergence layer is incorporated to query and keep track of all clients connected with the wireless communication system through different wireless technologies, such as 5G and/or WLAN. The shared channel information may be modeled into a set of coordinates. For each coordinate, a set of operational parameters, such as beamforming weights, Tx and Rx rate, Tx power, and Rx gain on a per-channel basis are determined. These operational parameters are passed onto schedulers of the different wireless technologies, which then use these operational parameters when clients are around corresponding coordinates.

17 Claims, 3 Drawing Sheets

SYSTEMS AND METHODS FOR WIRELESS CHANNEL INFORMATION SHARING

TECHNICAL FIELD

The present disclosure relates generally to wireless communication. More particularly, the present disclosure relates to systems and methods for wireless channel information sharing to improve system performance.

BACKGROUND

The importance of wireless communication in today's society is well understood by one of skill in the art. Advances in wireless technologies have resulted in the ability of a communication system to support wireless communications of different standards, e.g., 5G New Radio (NR), 4G LTE, Wi-Fi, etc.

Different wireless technologies, e.g., 4G/5G and WLAN, operate very differently in the medium access control (MAC) layer and the physical layer (PHY). Each wireless technology has a distinct method of determining certain operation parameters, e.g., beamforming weights, transmit and receive rates, and/or location of the client device. A fast and accurate determination of those operation parameters may greatly improve the system performance for wireless communication. However, each wireless technology has its own challenge for fast and accurate determination of the operation parameters.

Accordingly, what is needed are systems, devices, and methods that address the above-described issues for improving wireless communication system performance.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
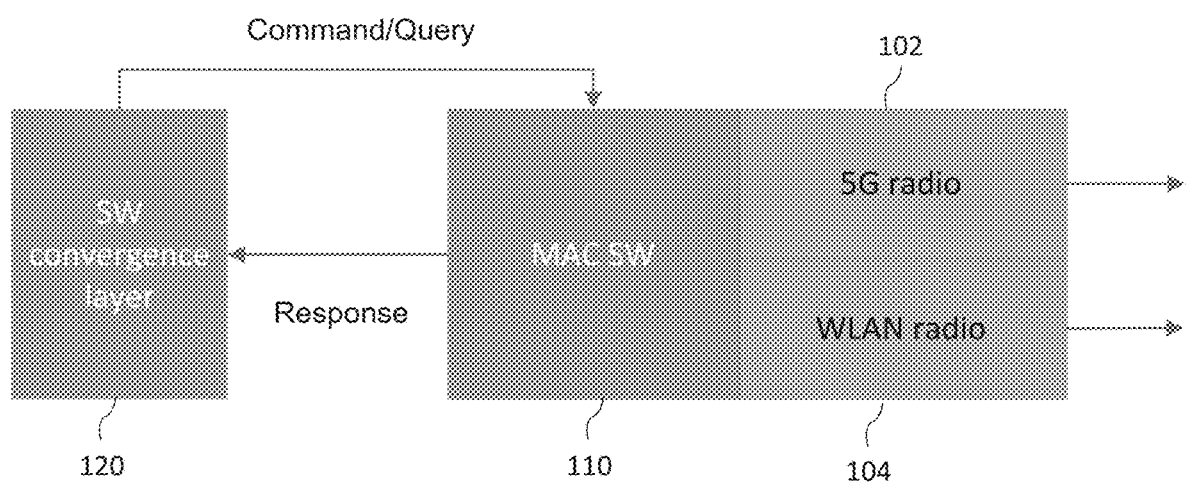
FIG. 1 ("FIG. 1") depicts a block diagram of wireless channel information sharing, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion, components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" or "packet" shall not be interpreted as limiting embodiments of the present invention to 5G networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

A. Current Wireless Positioning Methods

In a wireless communication system, accurate, reliable, and fast positioning for a client or user equipment (UE) is desirable to maintain a stable wireless link. In addition, the UE location information may be used in determining a plurality of operational parameters of a wireless base station, an access point, etc. The operational parameters may include but not be limited to beamforming weights, transmit (Tx) power, receive (Rx) gain setting, and/or Tx/Rx rates, etc.

Different wireless technologies have respective methods and challengings for UE positioning. In a Wi-Fi communication system, multiple Wi-Fi hotspots or access points may be involved for UE positioning. Common localization techniques for Wi-Fi positioning may be based on received signal strength indicator (RSSI), angle of arrival (AoA), and/or time of flight (ToF). RSSI localization is based on measuring signal strength from a UE at several different access points and then combining the measurements to determine, by trilateration or multi-lateralation, the distance between the UE and the access points. RSSI measurements may fluctuate according to changes in the ambient environment, which negatively impact the accuracy of RSSI-based UE positioning. Furthermore, when the number of Wi-Fi access points is limited or when the location precisions of the access points are not precise, the accuracy of UE positioning is also restricted.

Wi-Fi access points with multiple-input and multiple-output (MIMO) Wi-Fi interfaces can use antenna arrays to estimate the AoA of the multipath signals received at the antenna arrays and apply triangulation to calculate UE locations. Wi-Fi preamble may be used for locationing based on AoA. Although this technique is usually more accurate than others, it may require special hardware in order to be deployed, such as an array of multiple antennas.

In a 5G NR system, a positioning reference signal (PRS) in a downlink and a sounding reference signal (SRS) in the uplink may be used for UE positioning. Power, angular, or time measurement may be used for the PRS. A 5G base station, such as a gNodeB (gNB), may use beam sweep across various directions for UE positioning. Beamforming may be achieved by adjusting beamforming weights among multiple antenna elements transmitting to create a pattern of constructive and destructive interference in the wavefront, resulting in a focused beam toward a specific direction. Beam steering may be achieved by changing the beamforming weights on the multiple antenna elements. Different frequency beams may be steered in different directions to serve different UEs. The beam direction may be determined dynamically by a base station to allow effective UE tracking. 5G may use Synchronization Signal block (SSB), e.g., primary synchronization signal (PSS) block, secondary synchronization signal (SSS) block, physical broadcast channel (PBCH) Block, to find the location with AoA. Additionally, UE may report observed time difference of arrival (OT-DOA) of time delay from different 5G cells for UE positioning.

With an accurate UE location, the base station may implement desired or fine-tuned beamforming weights, Tx power, Rx gain, and Tx/Rx rate to serve the UE better. While positioning may provide better accuracy and multipath resolution, 5G positioning still faces several challenges, such as a lack of framework dedicated to low-power specifications.

Described in the following sections are system and method embodiments for wireless channel information sharing across different wireless technologies, such as between 5G and Wi-Fi, to improve system performance.

B. Embodiments of Wireless Channel Information Sharing

FIG. 1 depicts a block diagram of wireless channel information sharing in a wireless communication system, according to embodiments of the present disclosure. As shown in FIG. 1, a software convergence layer 120 is instantiated in the system to interact with the MAC software layers 110 of different wireless technologies, such as 4G/5G cellular and WLAN. The software convergence layer 120 queries and tracks UEs or clients connected to the system through 4G/5G cellular and/or WLAN. Wireless channel information of the connected UEs is shared across the different wireless technologies. In one or more embodiments, the information is modeled as a set of coordinates. For each coordinate, a set of operational parameters are determined. The set of operational parameters may comprise beamforming weights, Tx and Rx rates, Tx power, Rx gain, etc., on a per-channel basis. The determined operational parameters are then passed onto schedulers of each wireless technology, such as a 5G scheduler 102 and a WLAN scheduler 104, which use those operational parameters when clients are around the coordinates.

Figure 2:
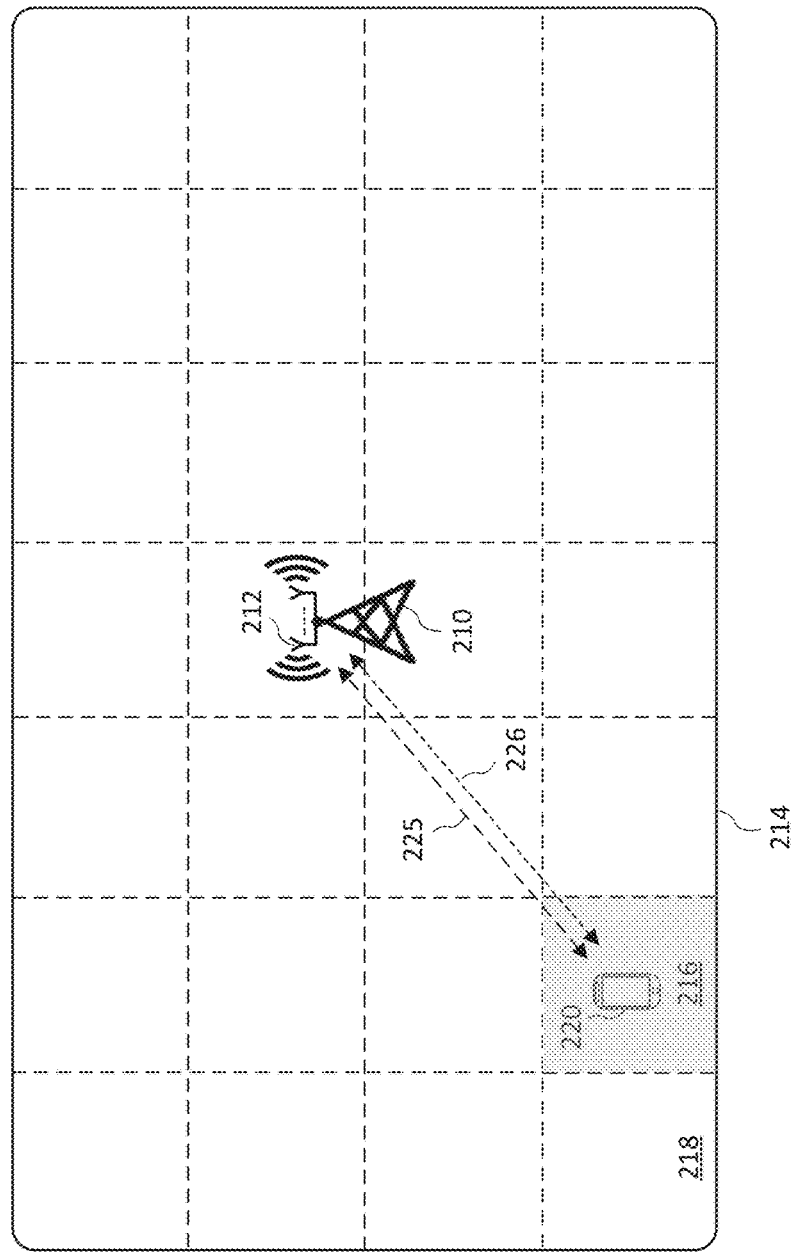
FIG. 2 graphically depicts a set of coordinates in a wireless communication system for shared wireless channel modeling, according to embodiments of the present disclosure.

FIG. 2 graphically depicts a set of coordinates in a wireless communication system for shared wireless channel modeling, according to embodiments of the present disclosure. A UE 220 connects to a wireless station 210 via a wireless channel 225. The wireless station 220 may be configured to support wireless communication in different wireless technologies, such as 4G LTE/5G NR or Wi-Fi. Hence, the wireless channel 225 may be a 4G/5G channel or a Wi-Fi channel. Alternatively, the wireless station 220 may communicate to the UE 220 via a first channel 225 in the first wireless technology (e.g., 4G/5G cellular) and a second channel 226 in the second wireless technology (e.g., Wi-Fi).

The coverage 214 of the wireless station 210 may be modeled into a set of coordinates 216, 218 . . . , which may or may not be distributed uniformly. When the UE 220 is in one coordinate 216, one or more operational parameters of the wireless station 210 may be applied based on the coordinate. The one or more operational parameters may comprise beamforming weights for multiple antenna elements 212 at the wireless station 210, Tx and Rx rates, Tx power, Rx gain, etc., on a per-channel basis. The one or more operational parameters may be shared or partially shared across the different wireless technologies. For example, the beamforming weights for 5G communication may also be applied for Wi-Fi communication, especially when the 5G channel and a Wi-Fi channel are in the same band.

Figure 3:
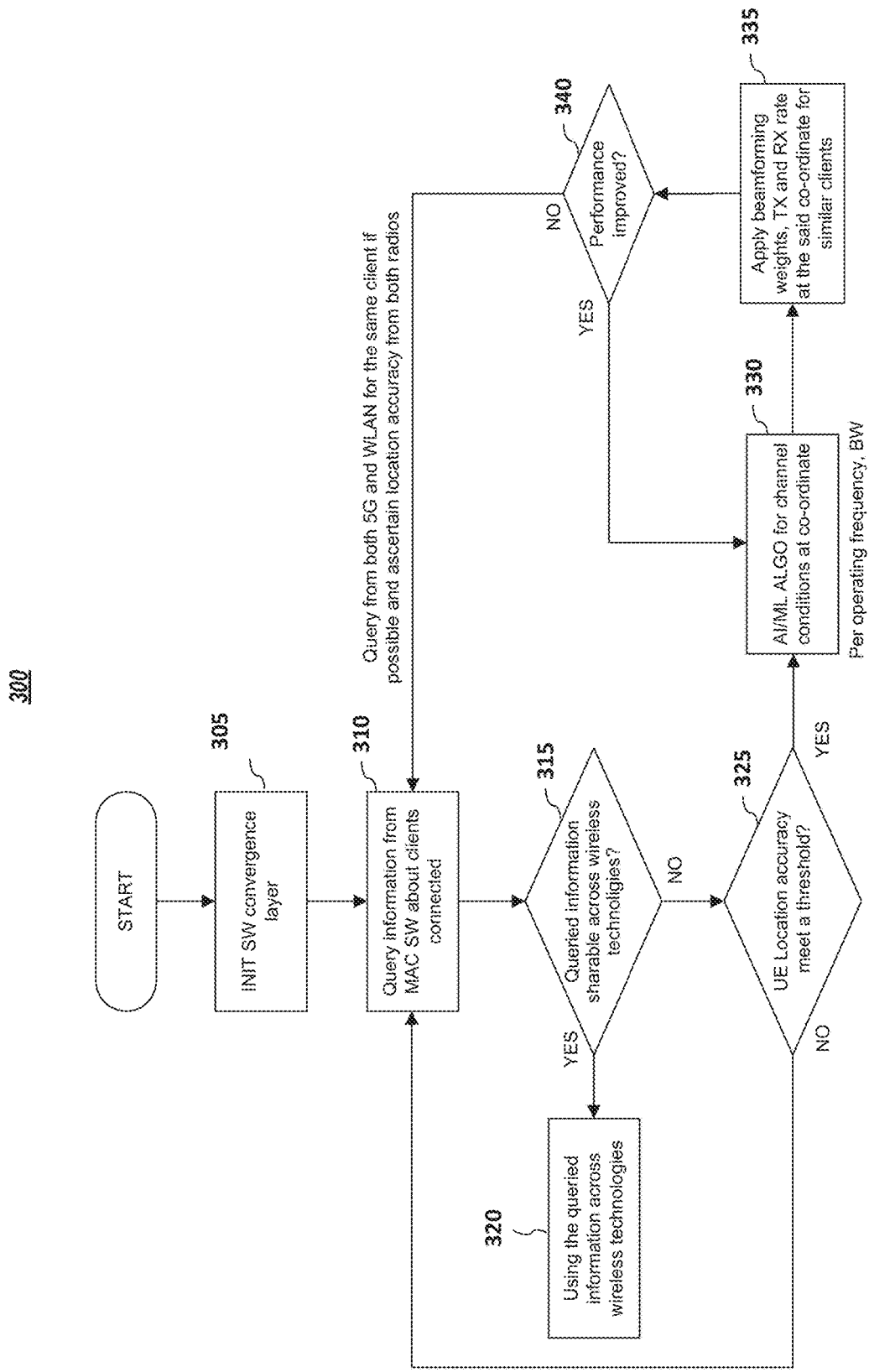
FIG. 3 depicts a flow diagram for wireless channel information sharing, according to embodiments of the present disclosure.

FIG. 3 depicts a flow diagram of wireless channel information sharing in a wireless communication system, according to embodiments of the present disclosure. In step 305, a software (SW) convergence layer is instantiated in a wireless station to interact with the MAC software layers for a first wireless technology (e.g., 5G) and a second wireless technology (e.g., Wi-Fi). The wireless station may be a radio base station, such as a 4G LTE eNodeB (eNB), an NS-eNB, or 5G gNB, which may comprise multiple antenna elements to support beamforming for directional communications to one or more UEs. In step 310, the SW convergence layer queries information from MAC software layers regarding UE connectivity. When a new UE or client is connected via a first wireless link corresponding to a first wireless technology, e.g., 4G/5G or WLAN, the convergence layer is informed. One or more operational parameters related to the first wireless link connecting the UE, e.g., UE location, Tx/Rx data rate, and beamforming weights are tracked and fed back into the convergence layer. In one or more embodiments, a map of channel information may be built at the convergence layer. The map comprises a set of coordinates with each coordinate associated with one or more operational parameters, e.g., Tx/Rx data rate, Tx power, Rx gain, modulation and coding scheme (MCS) to use, beamforming weights on a per spatial stream basis, etc., on a given channel or operating frequency.

In step 315, the SW convergence layer determines whether the queried information or part of the queried information may be shared across different wireless technologies. For example, when the queried information is related to a Wi-Fi link to which the UE is connected, the SW convergence layer determines whether the queried information related to the Wi-Fi link may be shared to a 4G/5G cellular link. The shareability may be determined based on one or more shareability factors, such as whether the different wireless technologies are using the same frequency band, whether one or more operation parameters in the queried information regarding the first wireless link corresponding to the first wireless technology meet connectivity threshold for a second wireless technology, etc. For example, when the SW convergence layer determines that the first wireless link to which the UE is connected is a Wi-Fi link at 5 GHz and the wireless station and the UE are capable of supporting 5G cellular link at the SW convergence layer may then determine that the queried information or part of the queried information for the 5 GHz Wi-Fi link may be shared directly to a 5 GHz cellular link. The shared information may comprise one or more parameters, such as beamforming weights, Tx/Rx data rate, Tx power, Rx gain, etc., among the one or more operational parameters related to the first wireless link.

In step 320, in response to a "YES" to step 315, the SW convergence layer applied the queried information or part of the queried information across wireless technologies. In response to a "NO" to step 315, the process goes to step 325 for further analysis of the queries information.

In one or more embodiments, accuracy evaluation may be implemented in step 325, wherein the accuracy of the UE location in a coordinate is evaluated against a predetermined threshold, e.g., 1 m for indoor applications. If the accuracy does not meet the predetermined threshold, the flow process goes back to step 310 for querying again. If the accuracy meets the predetermined threshold, the flow process goes to step 330, wherein a machine learning (ML) or artificial intelligence (AI) based algorithm may be used to derive or optimize the one or more operational parameters to be used for both the first and the second wireless technologies at the coordinate. In step 335, the one or more optimal operational parameters are applied for another UE at the coordinate. For example, the same beamforming weights, Rx/Tx data rates, Tx power, or Rx gain may be applied, at least initially, to the another UE at the same coordinate. In step 340, the applied one or more operational parameters may be adjusted to determine whether performance of wireless communication with the another UE improves. The performance may be evaluated by one or more indexes, such as SNR, power cost, error rate, communication latency, etc. In response to performance improvement determined, the flow process goes back to step 330 for further operational parameter updating or optimizing. In response to no performance improvement determined, the flow process goes back to step 310 to query again regarding UE connectivity or query from both 4G/5G and Wi-Fi for the same UE.

In one or more embodiments, the wireless channel information sharing may be applied for various types of deployments including:

(1) Wi-Fi and 4G/5G NR channels at different frequencies; for example, a Wi-Fi channel may use 5 GHz frequency while a 5G NR channel operates at 3.6 GHz.
(2) 5G New Radio Unlicensed (NR-U) with both channels operating at the same frequencies with listen before talk (LBT) implementations for channel access.

In the case of different frequencies used for different channels, channel information at a higher frequency may be used and adjusted by frequencies of operation for channel information at a lower frequency. While in the case of the same frequency, granular feedback of channel information may be used for operational parameter optimization.

In one or more embodiments, the convergence layer may also optimize channel utilization by reducing the need for explicit locationing or soliciting beamforming feedbacks on WLAN, if the convergence layer already has these data from the 5G stack. This is also applicable the other way around.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently, including having multiple dependencies, configurations, and combinations.

What is claimed is:

1. A method for wireless channel information sharing comprising:
    instantiating, in a wireless station, a software convergence layer to interact with medium access control (MAC) software layers in the wireless station for a first wireless technology and a second wireless technology;
    querying, from the software convergence layer, the MAC software layers regarding user equipment (UE) connectivity, the software convergence layer is informed once a UE is connected to the wireless station via one or more wireless channels;
    tracking and feeding one or more operational parameters related to the one or more wireless channels into the software convergence layer;
    determining, at the software convergence layer, whether at least part of the one or more operational parameters are sharable across the first wireless technology and the second wireless technology;
    in response to at least part of the one or more operational parameters being determined to be sharable, sharing the at least part of the one or more operational parameters across the first wireless technology and the second wireless technology; and
    in response to at least part of the one or more operational parameters being determined to be sharable, performing steps comprising:
        evaluating an accuracy of a location of the UE in a set of coordinates against a predetermined threshold, building, at the software convergence layer, the set of coordinates corresponds to a map of channel information, built by the software convergence layer, with each coordinate associated with one or more operational parameters on a per-channel basis;
        in response to the accuracy meeting the predetermined threshold, deriving the one or more operational parameters for both the first and the second wireless technologies at the coordinate; and passing the derived one or more operational parameters onto MAC schedulers of the first and the second wireless technologies.

2. The method of claim 1 wherein the first wireless technology is a 4G/5G cellular communication, the second wireless technology is a Wi-Fi communication.

3. The method of claim 2 wherein the one or more operational parameters are from a group comprising:
   beamforming weights for multiple antennas in the wireless station;
   transmit/receive data rates;
   transmit power;
   receive gain; and
   modulation and coding scheme (MCS).

4. The method of claim 1 further comprising:
   applying, at the wireless station, the derived one or more optimal operational parameters for another UE in wireless communication with the wireless station at the coordinate.

5. The method of claim 4 further comprising:
   determining, at the wireless station, whether performance of the wireless communication with the another UE improves by adjusting the applied one or more optimal operational parameters; and
   in response to performance improvement determined, updating the one or more operational parameters for both the first and the second wireless technologies at the coordinate.

6. The method of claim 5 wherein the performance of the wireless communication with the another UE is determined by one or more indexes comprising signal-to-noise ratio (SNR), throughputs, power cost, error rate, or communication latency.

7. The method of claim 1 wherein the wireless station is a radio base station.

8. A wireless station comprising:
   multiple antenna elements that support wireless communication in at least one of a first wireless technology and a second wireless technology;
   a software convergence layer to interact with medium access control (MAC) software layers in the wireless station, the software convergence layer is configured for performing operations comprising:
      querying the MAC software layers regarding user equipment (UE) connectivity, the software convergence layer is informed once a UE is connected to the wireless station via one or more wireless channels;
      tracking one or more operational parameters related to the one or more wireless channels;
      determining whether at least part of the one or more operational parameters are sharable across the first wireless technology and the second wireless technology;
      in response to at least part of the one or more operational parameters being determined to be sharable, sharing the at least part of the one or more operational parameters across the first wireless technology and the second wireless technology; and
      in response to at least part of the one or more operational parameters being determined to be sharable, performing steps comprising:
         evaluating an accuracy of a location of the UE in a set of coordinates against a predetermined threshold, building, at the software convergence layer, the set of coordinates corresponds to a map of channel information, built by the software convergence layer, with each coordinate associated with one or more operational parameters on a per-channel basis;
         in response to the accuracy meeting the predetermined threshold, deriving the one or more operational parameters for both the first and the second wireless technologies at the coordinate; and
         applying the derived one or more optimal operational parameters for another UE in wireless communication with the wireless station at the coordinate.

9. The wireless station of claim 8 wherein the first wireless technology is a 4G LTE or 5G communication, the second wireless technology is a Wi-Fi communication.

10. The wireless station of claim 8 wherein the one or more operational parameters are from a group comprising:
    beamforming weights for multiple antennas in the wireless station;
    transmit/receive data rates;
    transmit power;
    receive gain; and
    modulation and coding scheme (MCS).

11. The wireless station of claim 8 wherein the software convergence layer is configured for performing operations further comprising:
    determining whether performance of the wireless communication with the another UE improves by adjusting the applied one or more optimal operational parameters; and
    in response to performance improvement determined, updating the one or more operational parameters for both the first and the second wireless technologies at the coordinate.

12. The wireless station of claim 8 wherein the performance of the wireless communication with the another UE is determined by one or more indexes comprising signal-to-noise ratio (SNR), throughputs, power cost, error rate, or communication latency.

13. A non-transitory computer-readable medium or media comprising one or more sequences of instructions which, when executed by one or more processors, causes steps to be performed comprising:
    instantiating, in a wireless station, a software convergence layer to interact with medium access control (MAC) software layers in the wireless station for a first wireless technology and a second wireless technology;
    querying, from the software convergence layer, the MAC software layers regarding user equipment (UE) connectivity, the software convergence layer is informed once a UE is connected to the wireless station via one or more wireless channels;
    tracking and feeding one or more operational parameters related to the one or more wireless channels into the software convergence layer;
    determining, at the software convergence layer, whether at least part of the one or more operational parameters are sharable across the first wireless technology and the second wireless technology;
    in response to at least part of the one or more operational parameters being determined to be sharable, sharing the at least part of the one or more operational parameters across the first wireless technology and the second wireless technology; and
    in response to at least part of the one or more operational parameters being determined to be sharable, performing steps comprising:
       evaluating an accuracy of a location of the UE in a set of coordinates against a predetermined threshold, building, at the software convergence layer, the set of coordinates corresponds to a map of channel information, built by the software convergence layer, with each coordinate associated with one or more operational parameters on a per-channel basis;

in response to the accuracy meeting the predetermined threshold, deriving the one or more operational parameters for both the first and the second wireless technologies at the coordinate; and applying, at the wireless station, the derived one or more optimal operational parameters for another UE in wireless communication with the wireless station at the coordinate.

14. The non-transitory computer-readable medium or media of claim 13 wherein the first wireless technology is a 4G LTE or 5G communication, the second wireless technology is a Wi-Fi communication.

15. The non-transitory computer-readable medium or media of claim 13 wherein the one or more operational parameters are from a group comprising:

beamforming weights for multiple antennas in the wireless station;
transmit/receive data rates;
transmit power;
receive gain; and
modulation and coding scheme (MCS).

16. The non-transitory computer-readable medium or media of claim 13 wherein the non-transitory computer-readable medium or media further comprises one or more sets of instructions which, when executed by at least one of the one or more processors, causes steps to be performed comprising:

determining, at the wireless station, whether performance of the wireless communication with the another UE improves by adjusting the applied one or more optimal operational parameters; and in response to performance improvement determined, updating the one or more operational parameters for both the first and the second wireless technologies at the coordinate.

17. The non-transitory computer-readable medium or media of claim 16 wherein the performance of the wireless communication with the another UE is determined by one or more indexes comprising signal-to-noise ratio (SNR), throughputs, power cost, error rate, or communication latency.

* * * * *